US008913322B2

(12) United States Patent
Tuohiniemi (10) Patent No.: US 8,913,322 B2
(45) Date of Patent: Dec. 16, 2014

(54) MICROMECHANICAL TUNABLE FABRY-PEROT INTERFEROMETER AND A METHOD FOR PRODUCING THE SAME (75) Inventor: Mikko Tuohiniemi, Vtt (FI)

(73) Assignee: Teknologian Tutkimuskeskus VTT, VTT (FI)

(*) Notice: Subject to any disclaimer, the term of this patent is extended or adjusted under 35 U.S.C. 154(b) by 0 days.

(21) Appl. No.: 14/124,350

(22) PCT Filed: May 29, 2012

(86) PCT No.: PCT/FI2012/050518
§ 371 (c)(1),
(2), (4) Date: Dec. 6, 2013

(87) PCT Pub. No.: WO2012/168545
PCT Pub. Date: Dec. 13, 2012

(65) Prior Publication Data
US 2014/0111811 A1 Apr. 24, 2014

(30) Foreign Application Priority Data

Jun. 6, 2011 (FI) ........................................ 20115545

(51) Int. Cl.
G02B 27/00 (2006.01)
G01B 9/02 (2006.01)
G02B 26/00 (2006.01)
G01J 3/26 (2006.01)

(52) U.S. Cl.
CPC .......... G01B 9/02049 (2013.01); G02B 26/001 (2013.01); G01J 3/26 (2013.01)
USPC ............................ 359/578; 356/454; 356/519

(58) Field of Classification Search
USPC .......... 356/454, 519; 359/260, 263, 317, 318, 359/578
See application file for complete search history.

(56) References Cited

U.S. PATENT DOCUMENTS

| 5,739,945 A | 4/1998 | Tayebati |
| 2002/0015215 A1 | 2/2002 | Miles |

(Continued)

FOREIGN PATENT DOCUMENTS

| EP | 0668490 | 8/1995 |
| FI | 95838 | 3/1996 |

(Continued)

OTHER PUBLICATIONS

Walmsley, B. A. et al: "Design and optimisation of a MEMS-based tunable 1-15 Fabry-Perot infrared filter". 2006 Conference on Optoelectronic and Microelectronic Materials and Devices, Jan. 12, 2006, IEEE Conference Proc., p. 272-275, [online] [retrieved Oct. 10, 2012 Epoque], abstract; Chapter II; Figs. 1 and 2.

(Continued)

Primary Examiner — Tarifur Chowdhury
Assistant Examiner — Jonathon Cook
(74) Attorney, Agent, or Firm — Young & Thompson (57) ABSTRACT Electrically tunable Fabry-Perot interferometers produced with micro-optical electromechanical (MOEMS) technology. Micromechanical interferometers of the prior art require high control voltage, their production includes complicated production phases, and the forms of the movable mirrors are restricted to circular geometries. In the inventive solution, there is a gap in the movable mirror, whereby mirror layers opposite to the gap are connected with anchoring. The anchoring is such that the stiffness of the mirror is higher at the optical area than at the surrounding area. This way it is possible keep the optical area of the mirror flat even if the control electrodes extend to the optical area. Due to large electrodes, lower control voltages are required.

14 Claims, 7 Drawing Sheets

(56) References Cited

U.S. PATENT DOCUMENTS

| | | |
|---|---|---|
| 2003/0011864 A1 | 1/2003 | Flanders |
| 2008/0130089 A1 | 6/2008 | Miles |
| 2010/0142067 A1 | 6/2010 | Hanamura et al. |
| 2011/0222157 A1* | 9/2011 | Sano .............................. 359/578 |

FOREIGN PATENT DOCUMENTS

| | | |
|---|---|---|
| JP | 2011028119 | 2/2011 |
| JP | 2011053510 | 3/2011 |
| WO | 2011036346 | 3/2011 |

OTHER PUBLICATIONS

International Search Report, Dated Oct. 15, 2012, in PCT/FI2012/050518.

FI Search Report, Dated Apr. 2, 2012, in FI 20115545.

* cited by examiner

MICROMECHANICAL TUNABLE FABRY-PEROT INTERFEROMETER AND A METHOD FOR PRODUCING THE SAME

TECHNICAL FIELD

The invention relates to a Fabry-Perot interferometer and a method for producing a Fabry-Perot interferometer. More specifically, the invention relates to electrically tunable Fabry-Perot interferometers which are produced with micro-opto-electromechanical systems (MOEMS) technology. The technical field of the invention is specified in the preamble of the independent claim.

BACKGROUND TECHNOLOGY

Fabry-Perot interferometers are used as optical filters and in spectroscopic sensors, for example. A Fabry-Perot interferometer is based on parallel mirrors, such as quarter wave Bragg reflectors, wherein a Fabry-Perot cavity is formed between the mirrors. The pass band wavelength of a Fabry-Perot interferometer can be controlled by adjusting the distance between the mirrors i.e. the width of the cavity. It is common to use micromechanical technology for producing Fabry-Perot interferometers. Such a solution is described e.g. in patent document FI95838.

Figure 1A:
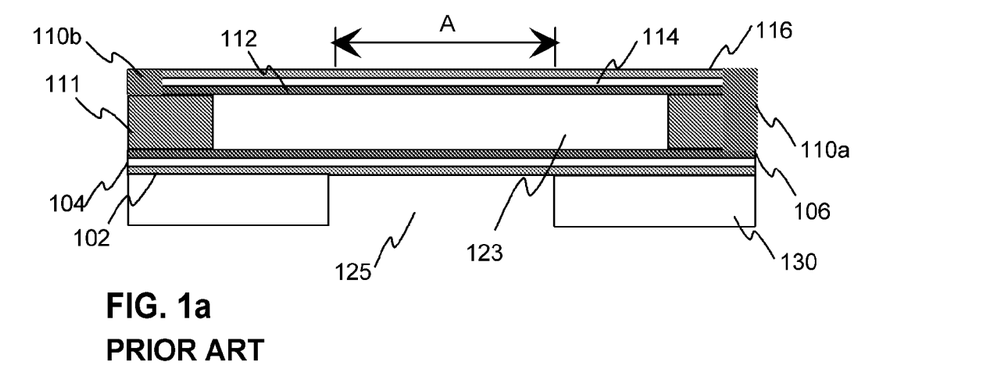
FIG. 1a illustrates a cross section of a prior art Fabry-Perot interferometer in a quiescent state.

FIG. 1a illustrates a prior art micromechanical Fabry-Perot interferometer produced on a substrate 130. Mirrors of a micromechanical interferometer usually include several layers 102, 104, 106, 112, 114, 116, wherein materials of adjacent layers have a different refractive index. The micromechanical interferometers used in short wavelength ranges of visible light and near-infrared radiation generally have solid mirror layers, such as a silicon dioxide or silicon nitride layer 104, 114 between silicon layers 102, 106, 112, 116. However, silicon oxide and silicon nitride have relatively high attenuation at long wavelengths, and therefore it is more preferable to use a layer of air between silicon layers in infrared range, especially in the wavelength range over 5 μm, i.e. thermal infrared radiation (TIR).

Movement of the mirror 112, 114, 116 is made possible by removing a sacrificial layer 111 from the optical area A and from a surrounding area around the optical area, whereby a cavity 123 is formed. The sacrificial layer may be e.g. silicon dioxide, which can be removed by etching with hydrofluoric acid (HF), for example. In order to allow the etching substance to reach the sacrificial layer, holes (not shown in FIG. 1a) are provided in the movable mirror. The remaining part of the sacrificial layer serves as a support for the movable mirror. The substrate has optionally been removed from the optical area 125 in order to avoid attenuation and reflection caused by the substrate.

Figure 1B:
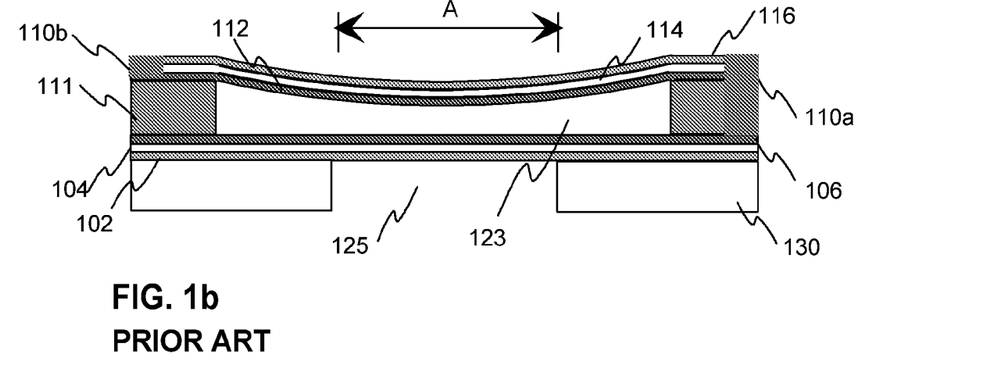
FIG. 1b illustrates a cross section of a prior art Fabry-Perot interferometer in an activated state.

The position of a moveable a mirror is controlled by applying voltage to electrodes, which are included in the mirror structures by making one layer 106, 112 of both mirrors conductive by e.g. doping. There are electrodes 110a and 110b for connecting a voltage to the electrodes. When control voltage is applied between the electrodes of the fixed and movable mirrors this voltage causes a force which moves the movable mirror towards the fixed mirror. If the electrodes cover the whole mirror, the movable mirror will be bent throughout the cavity area. This causes the distance between the movable mirror and the fixed mirror to vary within the optical area A during electrical activation. This is illustrated in FIG. 1b. The non-flatness of the movable mirror within the optical area causes the pass band frequency to vary within the optical area and the bandwidth to become wider. The quality factor of the filter, i.e. finesse, will therefore be reduced. As a result, the finesse of such an interferometer is not sufficiently high for several applications where high finesse is required.

The non-flatness of the movable mirror within the optical area can be avoided by providing the control voltage only outside the optical area of the mirrors. This solution is illustrated in FIG. 1b. The layer 106 is only connected to control voltage at the area outside the optical area, and the voltage applied to the electrode is thus not effective at the optical area. However, there are some disadvantages in this approach as well.

Firstly, due to a smaller electrode area a higher voltage is required between the electrodes in order to achieve sufficient force between the mirrors. It is often difficult to provide high voltages in small-sized sensor circuits, and also energy consumption may increase due to energy losses in a required voltage conversion.

Secondly, even if deflecting voltage is not applied in the optical area it is still necessary to provide electrodes within this area. This is because the optical areas of the mirrors must be connected to a constant voltage potential in order to avoid coupling of static electricity in the optical area, which might cause errors in the mirror position. The movable mirror and the fixed mirror must be in the same electrical potential at the optical area in order to avoid a force between the mirrors in that area. Therefore, a conductive layer of the optical area must be electrically separated from the electrode outside the optical area, and these conductive areas of a mirror must be connected to different voltage potentials. Connecting the conductive areas into different potentials requires providing electrically conductive feed-throughs and leads into several mirror layers. To achieve the electrical feed-throughs and leads a layer, patterning and doping must be applied. As a result the number of micromechanical process phases is increased. This makes the production of the interferometers complicated and makes the production cost too high for cost sensitive applications.

One further disadvantage relates to the shape of the interferometer. The mirrors need to have circular shape because any other lateral shape could cause wrinkling of a tensile-stressed thin-film mirror when it is vertically displaced by the electro-static actuation. On the other hand, circular form of a component is usually not preferable in electronics because the density of the components on a substrate or on an electrical circuit is not optimal.

SUMMARY OF THE INVENTION

The purpose of the present invention is to avoid or reduce disadvantages of the prior art. The purpose of the invention is thus to provide an interferometer which has a good finesse and is not too complicated to produce.

The object of the invention is achieved with an electrically tunable Fabry-Perot interferometer, comprising
  a substrate,
  a first mirror on the substrate,
  a second, movable mirror,
  the second mirror has a movable optical area and a movable area surrounding the optical area,
  a Fabry-Perot cavity between the first and second mirrors,
  the first mirror and the second mirror have electrodes for electrical control of the distance between the mirrors,
  at least the surrounding area of the second mirror has a gap between two layers of the mirror, and mirror layers at the opposite sides of the gap are connected with anchoring through the gap, which is characterised in that
    the electrodes of the first and second mirrors extend to the optical area, and
    the implementation of the anchoring is such that the stiffness of the second mirror at the surrounding area is lower than the stiffness of the second mirror at the optical area, whereby the second mirror is arranged to bend more at the surrounding area than at the optical area on activation of the electrodes with a control voltage.

The object of the invention is also achieved with a method for producing an electrically tunable Fabry-Perot interferometer, wherein
    a substrate is provided,
    a first mirror is provided on the substrate,
    a second, movable mirror is provided, wherein the second mirror has a movable optical area and a further movable area surrounding the optical area,
    a Fabry-Perot cavity is provided between the first and second mirrors,
    electrodes are provided for the first and second mirrors for electrical control of the distance between the mirrors,
    a gap is provided between two layers of the mirror in at least the surrounding area of the second mirror, and
    anchoring is provided for connecting mirror layers at the opposite sides of the gap with the anchoring through the gap,
which is characterised in that
    the electrodes of the first and second mirrors are formed to extend to the optical area, and
    the anchoring is such implemented that the stiffness of the surrounding area is lower than the stiffness of the optical area, whereby the movable mirror is arranged to bend more at the surrounding area than at the optical area on activation of the electrodes with a control voltage.

Significant advantages can be achieved with the present invention when compared to the prior known solutions. The invention makes it possible to achieve a movable mirror where the stiffness of the optical area is high compared to the area surrounding the optical area. It is therefore possible to achieve good flatness of the movable area even if the electrodes extend to the optical area of the mirrors. An interferometer with good finesse can thus be produced.

It is possible to extend the electrodes to the whole area of the movable area of the mirror. Therefore, it is not necessary to provide other, electrically separated conductive areas in the mirrors. The corresponding leads and feedthroughs of the mirror layers are thus avoided, and the production process is thus simple.

When control electrodes extend to the optical area of the mirrors the required movement of the movable mirror can be achieved with a lower control voltage. It is therefore possible to use the interferometers in devices where higher voltage is not available and without specific voltage up-converters.

The invention allows various geometries of electrodes, and the electrodes may cover smaller or larger portions of the optical area. According to one embodiment of the invention, the control electrodes extend over substantially whole optical area of the mirrors. With this embodiment it is possible to achieve minimal values of required control voltages.

In one embodiment of the invention the anchoring includes individual anchors through the gap, which have a shape of a beam or a cylinder, for example. Such anchors can be made of the same material as the layers at the opposite sides of the gap, and the anchors can be preferably deposited with the same, simultaneous process as the layer above the anchors. The width of the anchor are preferably smaller than or about the same size as the height of the anchor. The anchors are preferably perpendicular to the mirror planes.

The density of the anchors is preferably higher in the optical area of the movable mirror than at the surrounding area. This way a higher stiffness is achieved in the optical area compared to the surrounding area. Another alternative is providing different geometries in the distribution of the anchors, and/or providing different forms of the anchors and/or providing different widths of the anchors. It is further possible that the mirror stiffness between the optical area and the surrounding area of the movable mirror is based on the material properties of the anchors.

In one embodiment of the invention both mirrors of the interferometer have gaps which serve as layers of the mirror. Such a structure is preferable in long wavelength applications, such as TIR applications.

According to a further embodiment of the invention the movable mirror has gaps only outside the optical area, and the fixed mirror may be without a gap. While solid mirror layers are used in the optical area of the movable mirror, the surrounding area of the movable mirror is made more flexible by the gap/anchor structure.

The gap of a mirror preferably includes air, but it may also include other gas which is transparent at the operational wavelength range of the interferometer. The gap may also include a vacuum.

In one embodiment of the invention the form of the movable area of the second mirror is non-circular, preferably rectangular or square. The present invention makes it possible to use non-circular form of the movable area by using locally irregular distribution of anchoring. This way it is possible to compensate the irregular bending of the mirror in a non-circular geometry. It is possible to use same or different geometry in the forms of the optical area and the movable area of the mirror. For example, the movable area may be square, and the optical area may be circular.

If the movable area of the mirror is non-circular, preferably square, it is possible to include a higher number of interferometers in a given substrate area than if circular movable area is used. It is also possible to produce an interferometer component with a given optical area, which has a smaller component size than if circular movable area is used.

In one embodiment of the invention there are bumps extending from the mirror surface towards the other mirror for preventing touching of the even surfaces of the movable and fixed mirrors with each other. It is preferable to provide the bumps at locations of anchors at the surface area of the mirror.

Some further preferable embodiments of the invention are described in the dependent claims.

Since polycrystalline silicon and air both have low attenuation in the infrared range wavelengths it is possible to provide interferometers which have good performance even within long wavelength ranges, such as 5-30 µm. However, it is also possible to use the interferometers according to the invention within shorter wavelength ranges.

In this patent application the term "mirror" means a structure where there is a set of layers which reflects light in an optical area of the mirror. The "mirror" also includes areas of the layers that are outside the optical area.

In this patent application the terms "radiation" or "light" are used to mean any radiation in the optical range of wavelengths.

In this patent application "sacrificial layer" means a material layer which is at least partially removed in the final product.

In this patent application term "density of anchors" means the number of anchors in a given area of a mirror.

In this patent application terms "silicon oxide", "silicon dioxide" and "SiO$_2$" comprise materials which may be formed by various alternative methods, such as PECVD, LPCVD, thermal oxidation, spin-on glass (SOG), and which may optionally be doped with various additives, such as phosphorus or boron, and which may be deposited from various alternative source materials such as silane, TEOS etc.

The material is thus not restricted to any single stoichiometric compound.

SHORT DESCRIPTION OF THE DRAWINGS

In the following part the preferable exemplary embodiments of the invention are described in more detail by referring to the enclosed drawings, in which.

DETAILED DESCRIPTION OF THE EMBODIMENTS

Figure 1C:
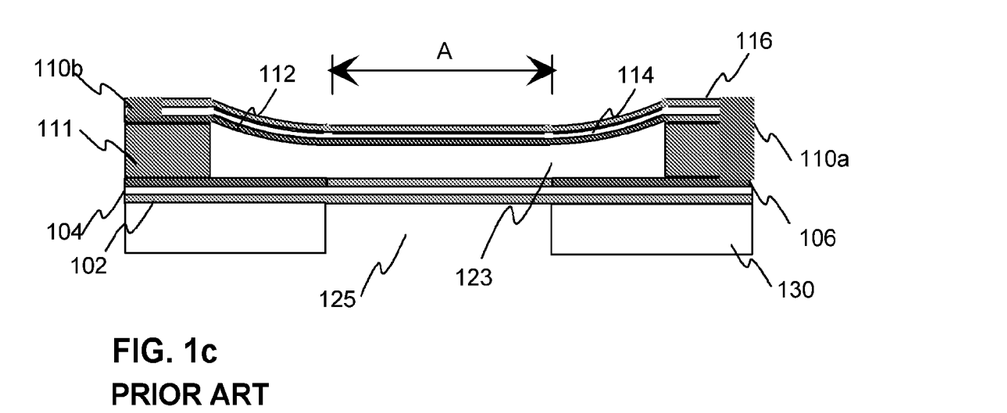
FIG. 1c illustrates a cross section of another prior art Fabry-Perot interferometer in an activated state.

FIGS. 1a, 1b and 1c were described in the prior art section of the description.

Figure 2:
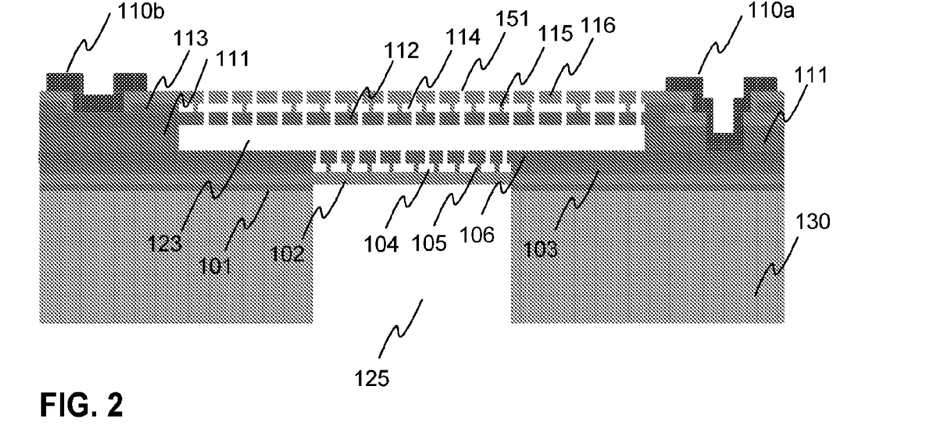
FIG. 2 illustrates a cross section view of an exemplary electrically tunable Fabry-Perot interferometer according to the invention wherein both mirrors include an air gap in the optical area.

FIG. 2 illustrates a cross section of an exemplary Fabry-Perot interferometer according to the invention. The interferometer has a substrate 130 of e.g. monocrystalline silicon material, wherein there may be a hole 125 at the optical area of the interferometer, thus providing an optical aperture for the interferometer. If the substrate is heavily doped the substrate layer attenuates the radiation and prevents the transmission of radiation outside the optical aperture. However, an aperture may also be provided with a separate non-transparent layer, without removing the substrate.

The reflecting layers of the fixed mirror are provided by layers 102, 104, 106, wherein layers 102 and 106 are of polycrystalline silicon, and layer 104 is a gap which includes vacuum, air or other gas which is transparent in the operating wavelength range. The gap has been formed by removing a sacrificial layer of silicon oxide 103 from the optical area. Layer 106 is made of doped polycrystalline silicon and serves as a control electrode of the fixed mirror.

The interferometer has a second, movable mirror which has reflecting layers 112, 114, 116. Layers 112 and 116 are of polycrystalline silicon, and layer 114 is a gap which includes vacuum, air or other transparent gas. The gap has been formed by removing a sacrificial layer of silicon oxide 113 from the optical area. Layer 112 is made of doped polycrystalline silicon and serves as an electrically conducting control electrode of the movable mirror.

The electrode of the lower, fixed mirror is electrically connected to the connection 110a, and the electrode 112 of the movable mirror is connected the connection 110b. The electrical connections 110a, 110b are made of aluminium, for example. The electrodes cover substantially the whole area of the mirror. In this way the control voltage between the mirror electrodes produces a maximal force between the mirrors, and accordingly, a minimum force is required for obtaining a determined deflection of the movable mirror. By providing electrodes on the whole area of the mirror it is possible to avoid the electrostatic coupling of charges to the mirrors.

There are anchors 105, 115, in the gaps of mirror structures for keeping the width of the gap constant throughout the optical area. The anchors connect the layers at the opposite sides of the gap mechanically to each other. The anchors preferably cover only a small part, such as 1-10% of the optical area in order to avoid significant attenuation. The width of each anchor may be a few μm, for example. It should be noted that the sizes of the anchors and the holes are highly enlarged in the cross section Figures of this application in order to better illustrate the anchor structure. The anchors can be made of the same polycrystalline silicon material as the layers, for example. It is preferable to deposit the anchors with the same process as the layer above the anchoring.

According to the present invention, the stiffness of the movable mirror is made higher at the optical area than at the surrounding area. To achieve this, the density of anchors is preferably higher in the optical area than in the surrounding area. To achieve the required variation in the stiffness it is also possible to use different distribution geometry of the anchors. Further, it is possible to use an inhomogeneous distribution of anchors for compensating local variation of required stretching of the mirror in case the movable part of the mirror is non-circular.

The value of the gap width of the mirrors is preferably $\lambda/4$, wherein $\lambda$ is the centre wavelength of the interferometer pass band. The optical thickness of the other mirror layers is preferably also $\lambda/4$. However, the gap width/optical thickness may alternatively be some multiple of $\lambda/4$.

The cavity of the interferometer is formed by the space 123, from which sacrificial silicon oxide layer has been removed. The sacrificial layer is etched e.g. by liquid or vapour HF through holes 151 of the second mirror. The second mirror will thus become movable. The silicon oxide layer has been removed from the optical area of the interferometer but it is not removed from the edges 111 of the silicon oxide layer. The remaining silicon oxide layer between the edges of the movable upper mirror and the lower fixed mirror serves as a support for the movable upper mirror.

Figure 3:
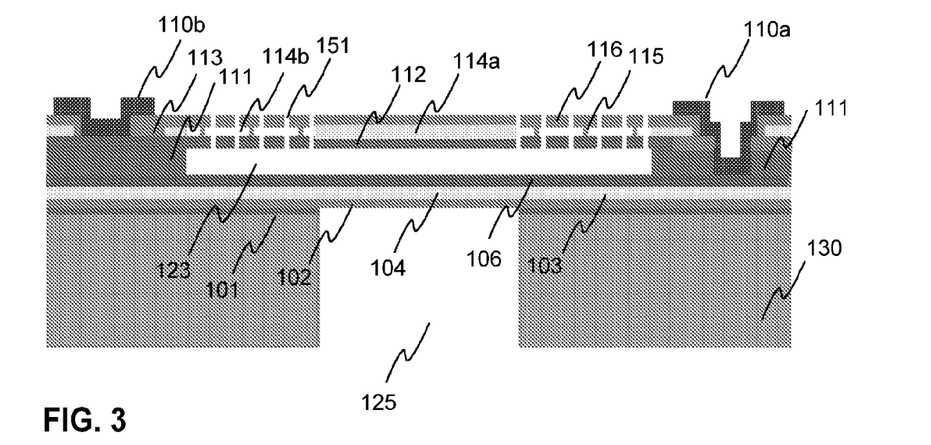
FIG. 3 illustrates a cross section view of another exemplary electrically tunable Fabry-Perot interferometer according to the invention wherein both mirrors include solid layers in the optical area.

FIG. 3 illustrates an electrically controllable Fabry-Perot interferometer according to another embodiment of the invention. In this interferometer the all mirror layers are solid material at the optical area. This interferometer is thus usable in shorter wavelengths of radiation. The fixed mirror has e.g. a layer 104 of silicon oxide or silicon nitride between layers 102 and 106 of silicon. Layer 106 is doped in order to provide an electrically conducting electrode at the fixed mirror. In the optical area the movable mirror has e.g. a layer 114 of silicon oxide or silicon nitride between layers 112 and 116 of silicon. Outside the optical area there is an air gap 114b between the layers 112 and 116 of silicon, which are coupled with anchors 115. Layer 112 is doped in order to provide an electrically conducting electrode at the fixed mirror.

A movable mirror area including an air gap with anchoring is made more flexible than an area with solid material. Therefore, the stiffness of the movable mirror is higher at the optical area than at the surrounding area. As a result, the movable mirror bending of the movable mirror mainly takes place outside the optical area, while the mirror area at the optical area remains substantially flat.

Figure 4:
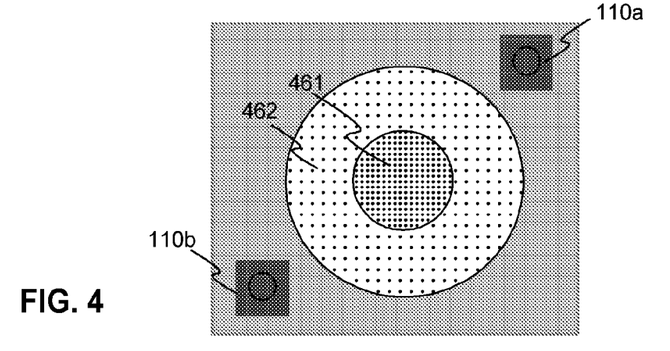
FIG. 4 illustrates a top view of an exemplary electrically tunable Fabry-Perot interferometer according to the invention.

FIG. 4 illustrates a top view of an exemplary electrically tunable Fabry-Perot interferometer according to the invention. The optical area 461 of the interferometer is circular, and around the optical area there is a further area 462 where the upper mirror is movable. The dots in the Figure illustrate anchors between the movable mirror and the fixed mirror. The density of the anchors is higher at the optical area 461 than at the area 462 outside the optical area. Thus, in accordance with the invention, the stiffness of the movable mirror is higher at the optical area than at the surrounding area. Therefore, the bending of the movable mirror takes place at the surrounding area 462, and the movable mirror remains relatively flat at the optical area 461.

The movable mirror is provided with small holes (not shown) which have been used for removing the sacrificial layer. The holes are preferably evenly distributed across the second mirror. The diameter of each hole may be e.g. 100 nm-5 μm. The holes may cover an area of 0.01%-5% of the optical area of the second mirror. Due to their small total area such holes do not have substantial effect on the performance of the interferometer.

FIG. 4 also illustrates the contacts 110a and 110b for the electrodes of the upper and lower mirrors. The contacts are located at corners of the interferometer.

FIGS. 5a, 5b, 5c, 5d and 5e illustrate a flow diagram of an exemplary method according to the invention for producing an electrically tunable Fabry-Perot interferometer, such as an interferometer of FIGS. 2 and 4. The production process is started by providing a wafer substrate, 51. The substrate can be e.g. monocrystalline silicon. Next an isolating layer of silicon oxide is deposited on the substrate by LTO (Low temperature Oxidation) deposition, 52. Then layers of a fixed mirror are deposited.

Figure 5A:
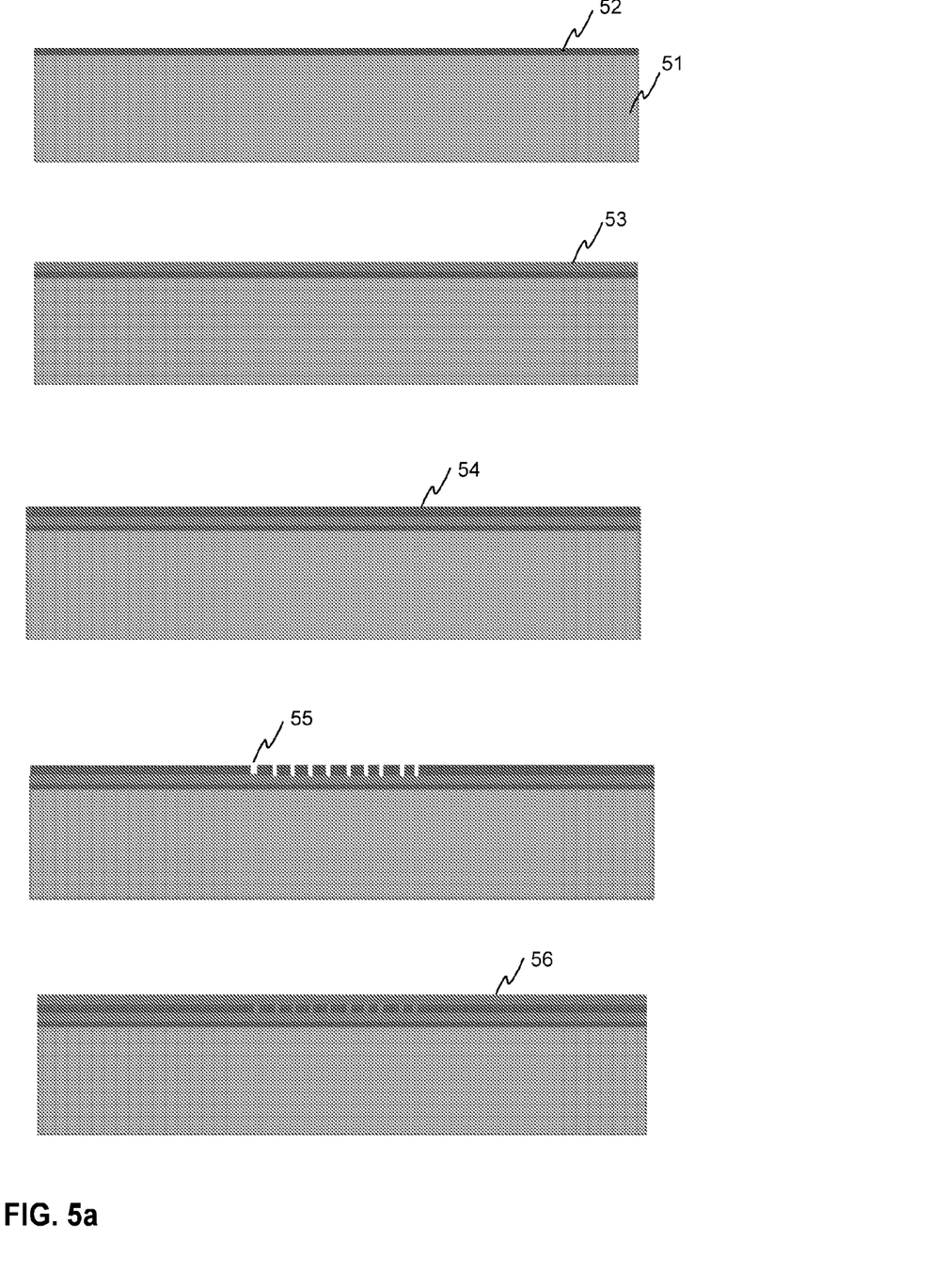
FIGS. 5a-5e illustrate an exemplary process for producing an exemplary Fabry-Perot interferometer according to the invention.

In phase 53 a layer of polycrystalline silicon is deposited. It is possible to provide holes in this layer for etching a sacrificial layer if required. It should be noted that in this embodiment of the invention it is not necessary to provide ion implantation for this layer because electrically conductive areas are not needed. After depositing polycrystalline silicon layers annealing is provided, but this will not be specifically mentioned in the following description of the further phases.

Figure 5B:
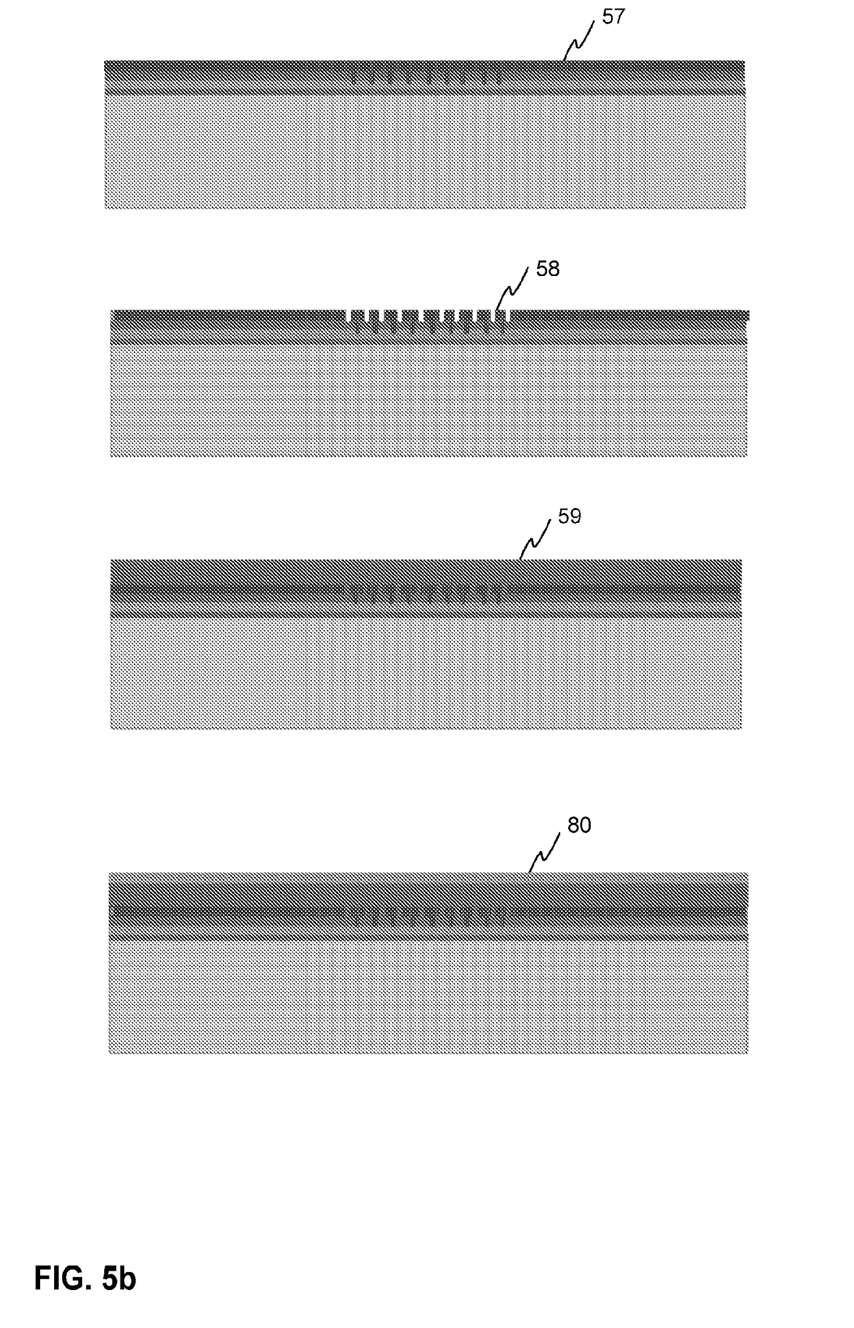

Next a sacrificial layer is deposited by e.g. LPCVD SiO$_2$ deposition, 54, which is then patterned, 55, for anchors. Then a polycrystalline silicon layer is deposited, 56, and conductive areas are formed by ion implantation 57. It should be noted that in this embodiment of the invention it is possible to have the whole layer electrically continuous because no isolating areas are required in the layer. The polysilicon is then patterned, 58, in order to provide holes for etching the sacrificial layer. Thus the layers for the fixed mirror have been produced.

Figure 5C:
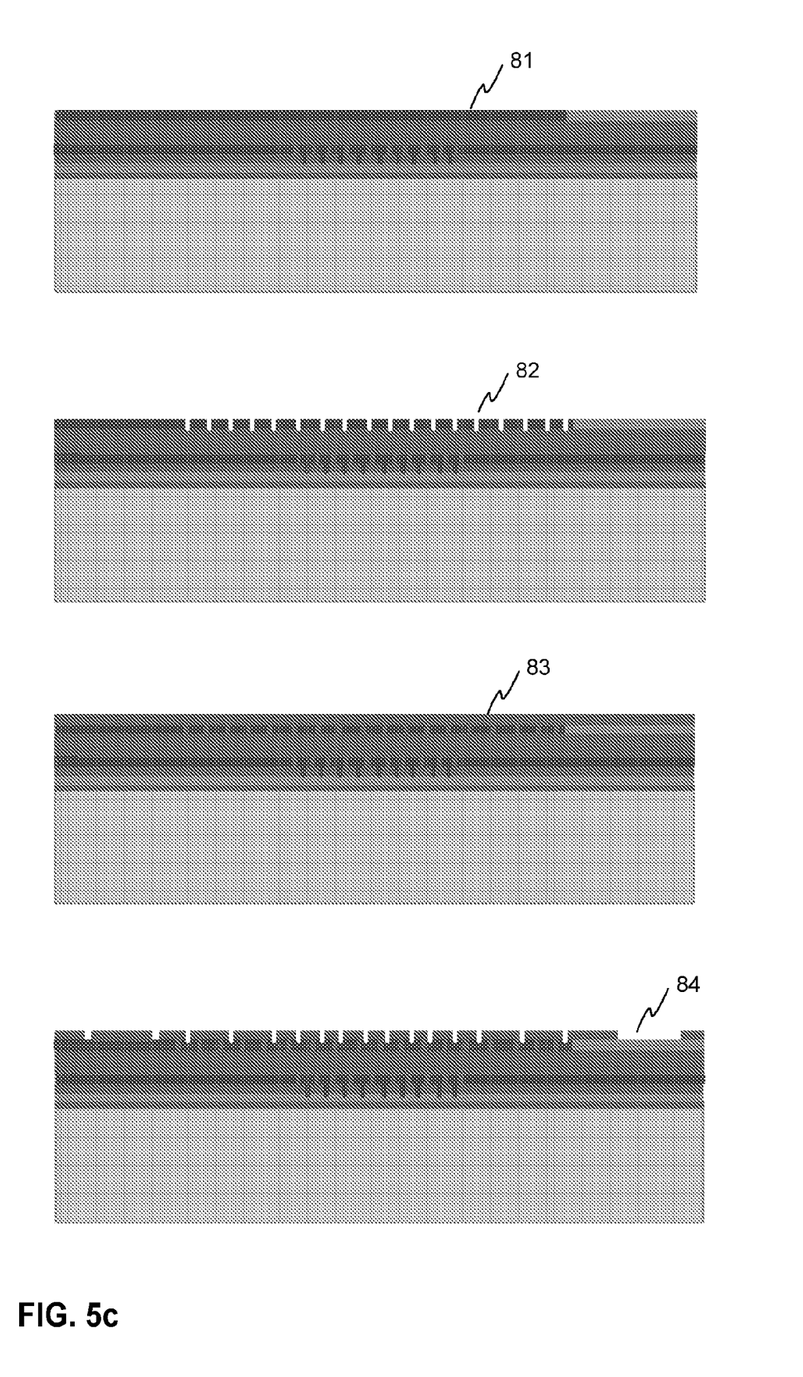

A sacrificial layer for forming a Fabry-Perot cavity is deposited by LPCVD SiO$_2$ deposition, 59. It is not necessary to pattern the sacrificial layer. Next, the layers for the movable mirror are produced. A layer of polycrystalline silicon is deposited, 80, and conductive area is formed by ion implantation, 81. The layer is patterned, 82, in order to provide holes for etching the sacrificial layer. Next a further sacrificial layer is made with LPCVD SiO$_2$ deposition, 83, and the layer is patterned, 84. With this patterning locations of anchors are determined for the movable mirror. The density of the anchors is preferably larger in the optical area than in the surrounding area. This way a higher value of stiffness is achieved in the optical area compared to the surrounding area. A layer of polycrystalline silicon is then formed with LPCVD deposition, 85, and holes are etched, 86. Thus the layers for the movable mirror have been produced.

Figure 5D:
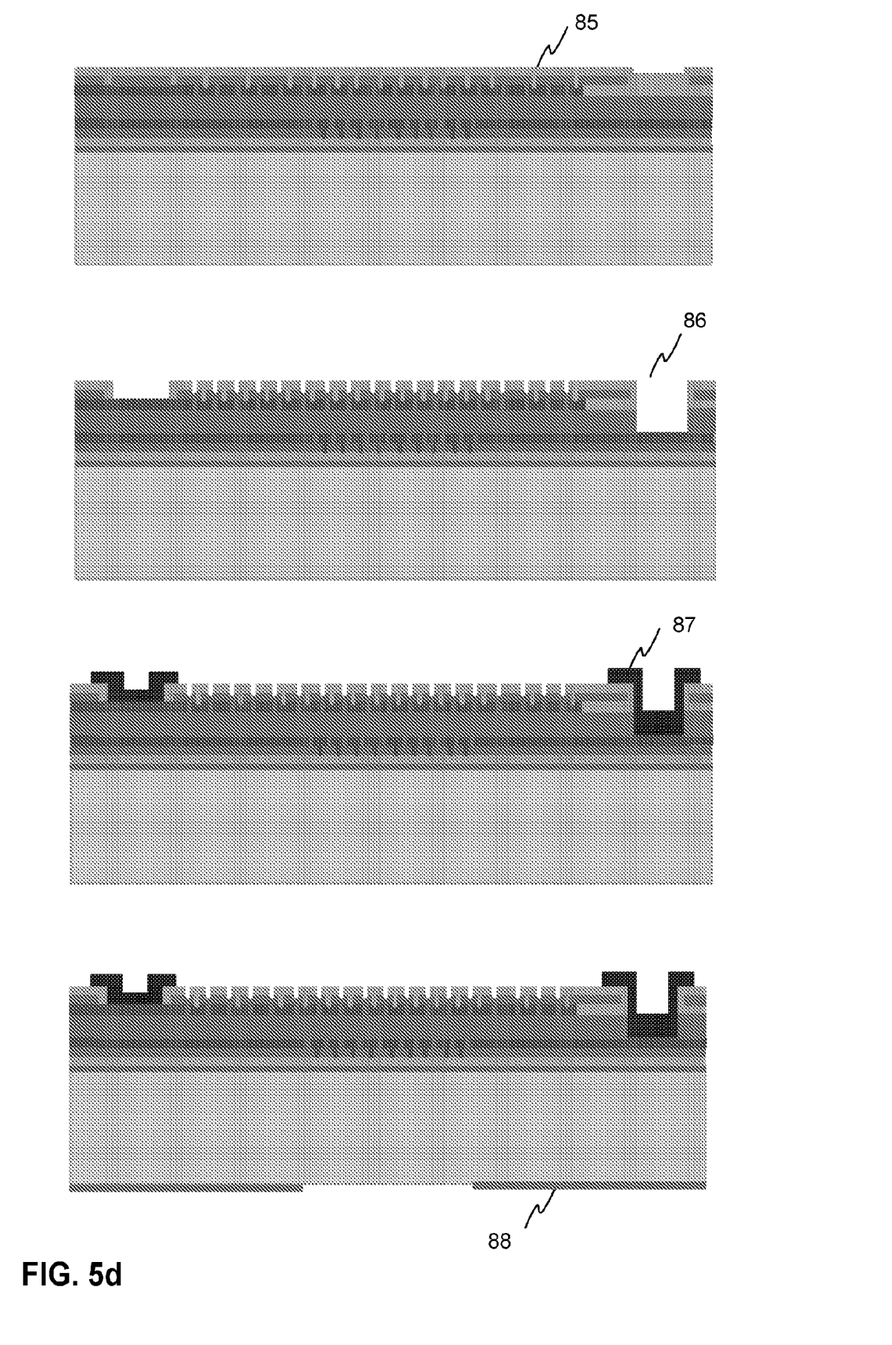
Figure 5E:
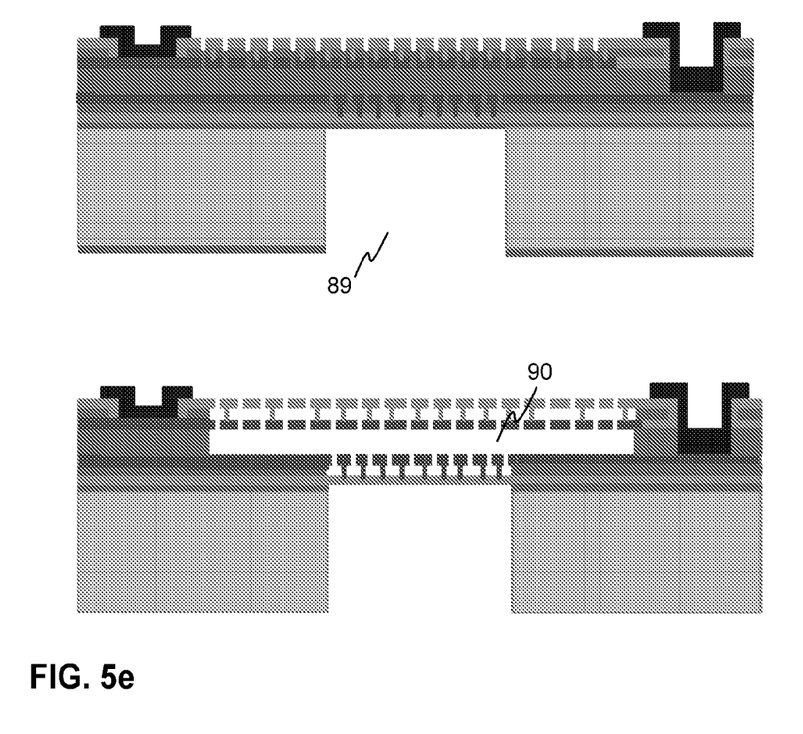

Metallization with aluminium is performed for the connectors by sputtering and patterning, 87. Next, the stack of oxide and poly-Si layers is patterned at the backside of the interferometer, 88. By ICP etching of silicon a hole/recess can be made to the substrate, 89, at the optical area. Finally, the interferometer chips are diced, and the sacrificial layer is etched, 90.

Figure 6:
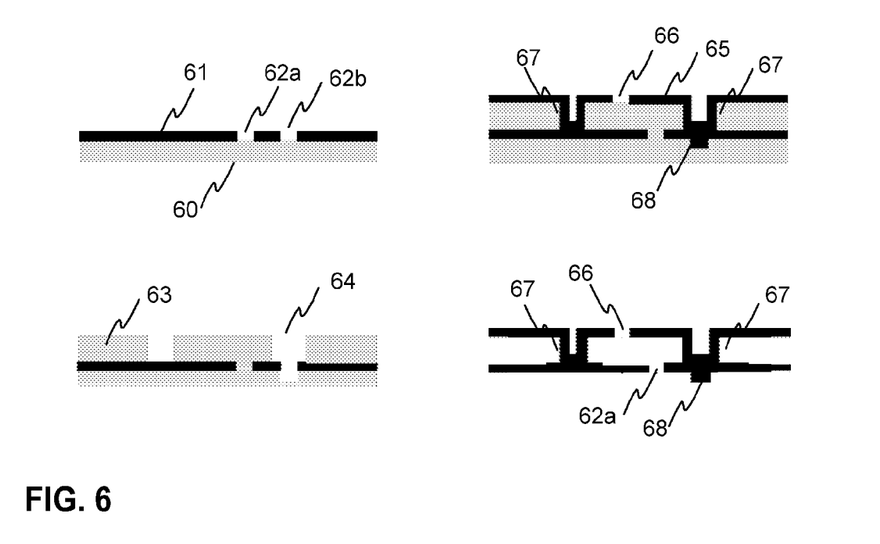
FIG. 6 illustrates an enlarged view of a part of a movable mirror in production phases of an anchor.

FIG. 6 an enlarged view of a part of a movable mirror in production phases of an anchor. The FIG. 6 also shows a bump which is produced for preventing the mirrors from sticking to each other when their surfaces touch due to electrical activation. After the first, bottom layer 61 of the movable mirror has been deposited on a sacrificial layer 60 (phases 80, 81 in FIGS. 5b and 5c), the layer is patterned (phase 82) in order to provide holes 62a for etching and for providing a hole 62b for a bump 68. A sacrificial layer 63 of the movable mirror is deposited (phase 83) and holes 64 for anchors are patterned (phase 84). The top layer 65 of the movable mirror is deposited (phase 85), whereby anchors 67 and a bump 68 are also formed. The anchor 67 illustrated in FIG. 6 has a cylindrical shape. The top layer of the mirror is patterned (phase 86) for forming holes 66 for etching. Finally the sacrificial layers 60, 63 are removed by etching (phase 90) through the holes 66 and 62a.

The invention has been described with the reference to the enclosed embodiments. It is, however, clear that the invention is not restricted only to those, but it comprises all embodiments which can be imagined within the inventive idea and the enclosed patent claims.

For example, some materials, dimensions and forms have been mentioned as examples for implementation of the invention. However, it is clear that dimensions, forms and materials as well as details of structure can be changed and optimised for each implementation according to the specific requirements.

The inventive interferometers have several preferable applications. They can be used as controllable filters in optical spectrometers, colour analyzers, imagers, optical data communications, and in various devices exploiting spectroscopy on organic compounds or polymers in gases or liquids. The invention is most preferably applied in infrared measurements, and particularly in the thermal infrared range.

The invention claimed is:

1. An electrically tunable Fabry-Perot interferometer, comprising:
   a substrate,
   a first mirror on the substrate,
   a second, movable mirror,
   the second mirror has a movable optical area and a movable area surrounding the optical area,
   a Fabry-Perot cavity between the first and second mirrors,
   the first and second mirror have electrodes for electrical control of the distance between the mirrors,
   at least the surrounding area of the second mirror has a gap between two layers of the mirror, and mirror layers at the opposite sides of the gap are connected with anchoring through the gap, wherein,
   the electrodes of the first and second mirrors extend to the optical area, and the implementation of the anchoring is such that the stiffness of the surrounding area is lower than the stiffness of the optical area, whereby the movable mirror is arranged to bend more at the surrounding area than at the optical area on activation of the electrodes with a control voltage, the second, movable mirror includes a gap also at the optical area, and the density of anchors in the gap of the second, movable mirror is higher at the optical area than at the surrounding area.

2. The electrically tunable Fabry-Perot interferometer according to claim 1, characterised in that the control electrodes extend to substantially whole optical area of the first mirror and the second mirror.

3. The electrically tunable Fabry-Perot interferometer according to claim 1, characterised in that the difference mirror stiffness between the optical area and the surrounding area is based on the distribution pattern of the anchors and/or the form and/or width of the anchors.

4. The electrically tunable Fabry-Perot interferometer according to claim 1, characterised in that both the first and second mirrors include a gap between layers at the optical area.

5. The electrically tunable Fabry-Perot interferometer according to claim 1, characterised in that the width of the gap is $\lambda/4$ wherein $\lambda$ is the centre wavelength of the pass band of the interferometer.

6. The electrically tunable Fabry-Perot interferometer according to claim 1, characterised in that the gap has a vacuum or that the gap includes air or other gas which is transparent at the operational wavelength range of the interferometer.

7. The electrically tunable Fabry-Perot interferometer according to claim 1, characterised in that the movable area of the interferometer is non-circular.

8. The electrically tunable Fabry-Perot interferometer according to claim 7, characterised in that there is a local irregularity in distribution of anchoring of the second mirror for preventing wrinkling of the mirror.

9. The electrically tunable Fabry-Perot interferometer according to claim 1, characterised in that the first and/or second mirror has bumps extending from the mirror surface towards the other mirror for preventing touching of the even surfaces of the first and second mirrors with each other.

10. The electrically tunable Fabry-Perot interferometer according to claim 9, characterised in that the bumps are located at positions of anchors at the surface area of the mirror.

11. The electrically tunable Fabry-Perot interferometer according to claim 1, wherein the movable area of the interferometer is rectangular.

12. The electrically tunable Fabry-Perot interferometer according to claim 1, wherein the movable area of the interferometer is square.

13. Method for producing an electrically tunable Fabry-Perot interferometer, wherein:

a substrate is provided, a first mirror is provided on the substrate, a second, movable mirror is provided, wherein the second mirror has a movable optical area and a further movable area surrounding the optical area, a Fabry-Perot cavity is provided between the first and second mirrors, electrodes are provided for the first and second mirrors for electrical control of the distance between the mirrors, a gap is provided between two layers of the mirror in at least the surrounding area of the second mirror, and anchoring is provided for connecting mirror layers at the opposite sides of the gap with the anchoring through the gap, wherein, the electrodes of the first and second mirrors are formed to extend to the optical area, and the anchoring is such implemented that the stiffness of the surrounding area is lower than the stiffness of the optical area, whereby the movable mirror is arranged to bend more at the surrounding area than at the optical area on activation of the electrodes with a control voltage, and anchoring is provided by depositing anchors, wherein the density of anchors in the gap of the second, movable mirror is made higher at the optical area than at the surrounding area.

14. The method according to claim 13, characterised in that the control electrodes made to extend to the whole optical area of the first mirror and the second mirror.

* * * * *